United States Patent
Shvets

(10) Patent No.: US 7,609,915 B2
(45) Date of Patent: Oct. 27, 2009

(54) APPARATUS AND METHOD FOR A WAVEGUIDE-BASED OPTICAL POLARIZER/ISOLATOR

(76) Inventor: Gennady Shvets, 6100 Chictora Cove, Austin, TX (US) 78759

(*) Notice: Subject to any disclaimer, the term of this patent is extended or adjusted under 35 U.S.C. 154(b) by 217 days.

(21) Appl. No.: 11/855,149

(22) Filed: Sep. 13, 2007

(65) Prior Publication Data
US 2009/0016668 A1 Jan. 15, 2009

Related U.S. Application Data

(60) Provisional application No. 60/844,217, filed on Sep. 13, 2006.

(51) Int. Cl.
G02B 6/26 (2006.01)
G02B 6/00 (2006.01)
(52) U.S. Cl. .................. 385/11; 385/39; 385/129
(58) Field of Classification Search ............. 385/11, 385/39, 129
See application file for complete search history.

(56) References Cited

U.S. PATENT DOCUMENTS

| | | | |
|---|---|---|---|
| 4,948,922 A | 8/1990 | Varadan et al. | |
| 5,588,078 A | 12/1996 | Cheng et al. | |
| 5,848,203 A * | 12/1998 | Kawakami et al. | 385/11 |
| 2005/0008308 A1 | 1/2005 | Bita et al. | |
| 2005/0073744 A1 | 4/2005 | Zheludev et al. | |

OTHER PUBLICATIONS

Bermel, P. A., et al., "Photonic band structure of highly deformable self-assembling systems," Phys Rev E (2001), 65 (010702):1-4.

Burt, G., et al., "Dispersion of helically corrugated waveguides: Analytical, numerical, and experimental study," Phys Rev E (2004), 70:046402.

Denisov, G. G., et al., "Gyrotron Traveling Wave Amplifier with a Helical Interaction Waveguide," Phys Rev Lett (1998), 81:5680-5683.

Denisov, G. G., et al., "Gyro-TWT with a Helical Operating Waveguide: New Possibilities to Enhance Efficiency and Frequency Bandwidth," IEEE Trans Plasma Science (1998), 26:508-518.

Izuhara, T., et al., "Direct wafer bonding and transfer of 10-mm-thick magnetic garnet films onto semiconductor surfaces," Appl Phys Lett (2000), 76:1261-1263.

(Continued)

*Primary Examiner*—Frank G Font
*Assistant Examiner*—Michael P Mooney
(74) *Attorney, Agent, or Firm*—Schwabe, Williamson & Wyatt, P.C.

(57) ABSTRACT

The present invention provides an apparatus for a one-way waveguide and/or a circular polarizer that includes a waveguide having a height, a width, a length and a wave propagation direction. A first wall of the waveguide has a first slanted groove. A second wall opposite the first wall of the waveguide has a second slanted groove. The first and second grooves are rotated clockwise around the wave propagation direction to approximate a helical groove. The present invention may also include a third slanted groove in a third wall adjacent to the first wall and second wall, a fourth slanted groove in a fourth wall opposite the third wall, and the first, second, third and fourth grooves are rotated clockwise around the wave propagation direction to approximate the helical groove.

21 Claims, 2 Drawing Sheets

OTHER PUBLICATIONS

Kobrinsky, M. J., et al., "On-Chip Optical Interconnects," Intel Technol J (2004), 8:129-141.
Kopp, V. I., et al., "Double-helix chiral fibers," Opt Lett (2003), 28:1876-1878.
Kopp, V. I. et al., "Chiral Fiber Gratings," Science (2004), 305:74-75.
Krasavin, A. V., et al., "Polarization conversion and "focusing" of light propagating through a small chiral hole in a metallic screen," Appl Phys Lett (2005), 86:201105.
Schwanecke, A. S., et al., "Broken Time Reversal of Light Interaction with Planar Chiral Nanostructures," Phys Rev Lett (2003), 91:247404.
Shvets, G., et al., "Propagation of electromagnetic waves in the plasma near electron cyclotron resonance: Undulator-induced transparencya," Phys Plasmas (2005), 12(05671):1-11.
Vallius, T., et al., "Optical activity in subwavelength-period arrays of chiral metallic particles," Appl Phys Lett (2003), 83:234-236.
Vlasov, Y. A., et al., "Losses in single-mode silicon-on-insulator strip waveguides and bends," Opt Exp (2004), 12:1622-1631.
Vlasov, Y. A., et al., "Active control of slow light on a chip with photonic crystal waveguides," Nature (2005), 438:65-69.
Wang. J. J., et al., "Monolithically integrated circular polarizers with two-layer nano-gratings fabricated by imprint lithography," J Vac Sci Technol B (2005), 23:3164-3167.
Wang. Z., et al., "Optical circulators in two-dimensional magneto-optical photonic crystals," (2005), 30:1989-1991.
Yang, Y-C, et al., "Photonic defect modes of cholesteric liquid crystals," Phys Rev E (1999), 60:6852-6854.

* cited by examiner

7,609,915 B2

APPARATUS AND METHOD FOR A WAVEGUIDE-BASED OPTICAL POLARIZER/ISOLATOR

PRIORITY CLAIM AND CROSS-REFERENCE TO RELATED APPLICATIONS

This patent application is a non-provisional application of U.S. provisional patent application 60/844,217 filed on Sep. 13, 2006 and entitled "Apparatus and Method for a Waveguide-Based Optical Polarizer/Isolator", which is hereby incorporated by reference in its entirety.

US GOVERNMENT RIGHTS

The U.S. Government may own certain rights in this invention pursuant to the terms of ARO MURI Grant No. W911NF-04-01-0203 and DARPA Contract No. HR0011-05-C-0068.

FIELD OF THE INVENTION

The present invention relates generally to the field of optics and, more particularly, to an apparatus and method for a waveguide-based optical polarizer/isolator.

BACKGROUND OF THE INVENTION

Without limiting the scope of the invention, its background is described in connection with optical polarizers/isolators. It is widely believed that the complete integration of electronics and photonics on a submicron scale [1] must be accomplished in the near future. Thus the toolbox of integrated photonics is rapidly expanding, reflecting recent technological advances in photonic crystals [2], dielectric waveguides [3], and magnetooptic materials [4]. Optical polarizers (devices that transmit only one light polarization) and related to them isolators (one-way optical elements that suppress reflection of at least one polarization) are particularly challenging to make in the integrated form.

Chiral twisted fiber gratings with a "perfect" double-helical perturbation of the refractive index have been suggested as polarization selective filters in the optical [6] and microwave [7, 8] frequency range. But, twisting is incompatible with silicon-based waveguides, which are also difficult to fabricate with cross sections different from the rectangular one. Accordingly, there is a need for an apparatus and method for a waveguide-based optical polarizer/isolator.

SUMMARY OF THE INVENTION

The present invention provides an apparatus and method for a one-way waveguide that can be used as an optical isolator. The waveguide utilizes chirality to introduce the asymmetry between the two circular polarizations. The waveguide is rectangular, and chirality is introduced by making slanted rectangular grooves on the waveguide walls. Chirality of the waveguide manifests as a strong circular dichroism, and is responsible for transmitting one circular polarization of light and reflecting the other. Optical isolation of the propagating circular polarization is accomplished when the chiral waveguide is placed in front of a nonchiral optical device. Even the crudest implementations of chirality are shown to exhibit significant circular dichroism.

The present invention solves the problem of developing a linear one-way optical element by using a rectangular waveguide with a chiral (arranged as a single right-handed helix) perturbation to its side walls. Because of the simple rectangular cross-section of the waveguide, and a rather crude implementation of chirality using periodically arranged slanted grooves in the waveguide wall, such a device should be relatively easy to fabricate and integrate with other optical waveguides. As demonstrated below, propagation of the right- and left-hand circularly polarized (RHCP and LHCP) laser fields can differ dramatically: a band of frequencies exists for which only the LHCP wave propagates through the chiral waveguide (ChW), effectively making it a simple circular polarizer [5].

The significance of the present invention's structures is that their helicity has a very crude discrete step and turn symmetry (neither "perfect" nor even continuous helix) and, therefore, are easy to implement in the context of integrated optics. Further simplification of the structure and suppression of Bragg scattering is due to the single-helix geometry of the grooves.

The present invention can also act as a polarization-preserving one-way waveguide when inserted between two optical elements (I and II) that need to be isolated from reflections. Under a proper choice of the laser frequency $\omega$, waveguide width D, and the helical pitch $\lambda_u \equiv 2\pi/k_u$, one of the polarizations (e.g., LHCP) can be largely transmitted by the ChW when incident from I (that needs to be isolated) towards II. Assume that the nonchiral element II reflects a small fraction $\eta \ll 1$ of the incident LHCP radiation. Because the polarization of the reflected radiation is now RHCP, it will be reflected by the ChW towards II, reflected again by II as LHCP, and finally emerge from the ChW into element I. Because two reflections from the element II are involved, the overall reflection coefficient can be as small as $\eta' = \eta^2 \ll \eta$. Because such isolator is reciprocal, it works only for one of the two circular polarizations. ChW is thus similar to another well-known reciprocal optical isolator based on a quarter wave plate placed behind a linear polarizer, with the important difference that both the incident on and transmitted through the ChW electromagnetic waves have the same polarization. The only practical drawback of a ChW-based isolator is that the most reflecting elements of the integrated optical network would have to be operated with the circularly polarized light.

More specifically, the present invention provides an apparatus that includes a waveguide having a height (H), a width (W), length of at least a period ($\lambda_u$) and a wave propagation direction (x). A first wall of the waveguide has a first slanted groove. A second wall opposite the first wall of the waveguide has a second slanted groove. The first and second grooves are rotated clockwise around the wave propagation direction (x) to approximate a helical groove.

The present invention also provides an apparatus comprising that includes a waveguide having a height (H), a width (W), length of at least a period ($\lambda_u$) and a wave propagation direction (x) wherein W=H=2L. The period ($\lambda_u$) is an integer multiple of L, and L is approximately equal to a quarter of the vacuum wavelength. A first wall of the waveguide has a first slanted groove. A second wall opposite the first wall of the waveguide has a second slanted groove. Each slanted groove is a channel, a cut, an incision or an indentation that is substantially rectangular having a width (w) and a height (h), and wherein the first and second grooves are rotated clockwise around the wave propagation direction (x) to approximate a helical groove.

The present invention may also include a third slanted groove in a third wall adjacent to the first wall and second wall, a fourth slanted groove in a fourth wall opposite the third wall, and the first, second, third and fourth grooves are rotated clockwise around the wave propagation direction (x) to approximate the helical groove.

In addition, the present invention provides a method for producing a one-way waveguide/circular polarizer by providing a waveguide having a height (H), a width (W), length of at least a period ($\lambda_u$) and a wave propagation direction (x), and creating a first slanted groove in a first wall of the waveguide and a second slanted groove in a second wall opposite the first wall such that the first and second grooves are rotated clockwise around the wave propagation direction (x) to approximate a helical groove.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1A:
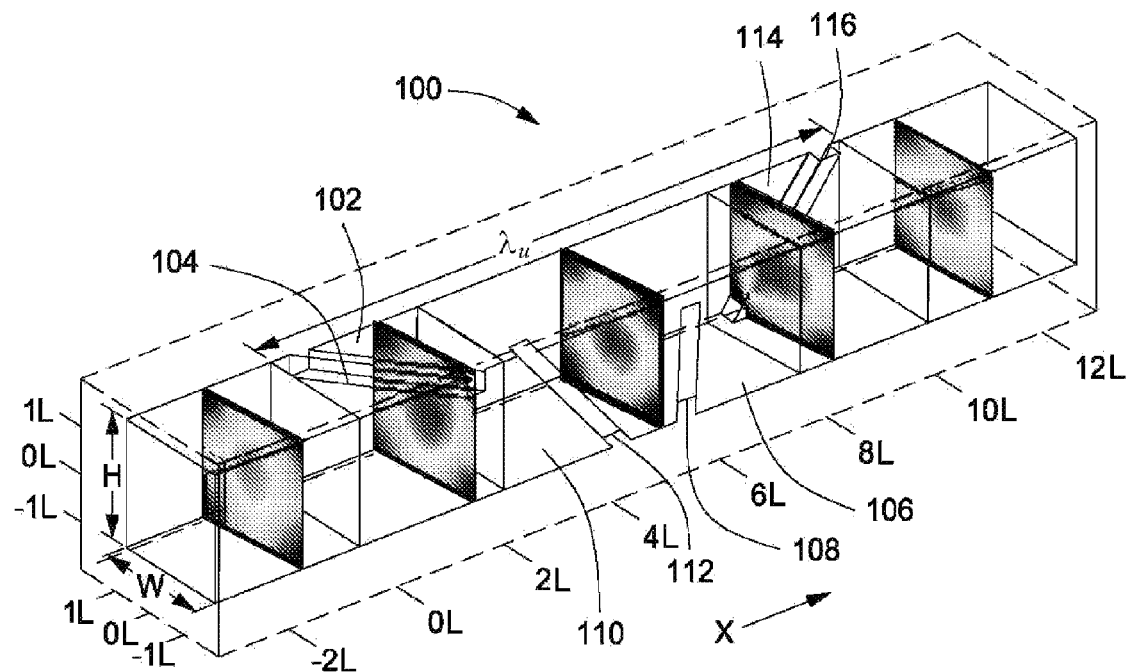
FIG. 1A is a schematic of a rectangular chiral waveguide with slanted wall grooves in all four walls in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to waveguide-based optical isolators/polarizers, but it will be understood that the concepts of the present invention are applicable to any optical system, method and apparatus.

The present invention provides an apparatus and method for a one-way waveguide that can be used as an optical isolator. The waveguide utilizes chirality to introduce the asymmetry between the two circular polarizations. The waveguide is substantially rectangular, and chirality is introduced by making slanted rectangular grooves on the waveguide walls. Chirality of the waveguide manifests as a strong circular dichroism, and is responsible for transmitting one circular polarization of light and reflecting the other. Optical isolation of the propagating circular polarization is accomplished when the chiral waveguide is placed in front of a nonchiral optical device. Even the crudest implementations of chirality are shown to exhibit significant circular dichroism.

The present invention solves the problem of developing a linear one-way optical element by using a rectangular waveguide with a chiral (arranged as a single right-handed helix) perturbation to its side walls. Because of the simple rectangular cross-section of the waveguide, and a rather crude implementation of chirality using periodically arranged slanted grooves in the waveguide wall, such a device should be relatively easy to fabricate and integrate with other optical waveguides. As demonstrated below, propagation of the right- and left-hand circularly polarized (RHCP and LHCP) laser fields can differ dramatically: a band of frequencies exists for which only the LHCP wave propagates through the chiral waveguide (ChW), effectively making it a simple circular polarizer [5].

The significance of the present invention's structures is that their helicity has a very crude discrete step and turn symmetry (neither "perfect" nor even continuous helix) and, therefore, are easy to implement in the context of integrated optics. Further simplification of the structure and suppression of Bragg scattering is due to the single-helix geometry of the grooves.

The present invention can also act as a polarization-preserving one-way waveguide when inserted between two optical elements (I and II) that need to be isolated from reflections. Under a proper choice of the laser frequency $\omega$, waveguide width D, and the helical pitch $\lambda_u \equiv 2\pi/k_u$, one of the polarizations (e.g., LHCP) can be largely transmitted by the ChW when incident from I (that needs to be isolated) towards II. Assume that the nonchiral element II reflects a small fraction $\eta \ll 1$ of the incident LHCP radiation. Because the polarization of the reflected radiation is now RHCP, it will be reflected by the ChW towards II, reflected again by II as LHCP, and finally emerge from the ChW into element I. Because two reflections from the element II are involved, the overall reflection coefficient can be as small as $\eta' = \eta^2 \ll \eta$. Because such isolator is reciprocal, it works only for one of the two circular polarizations. ChW is thus similar to another well-known reciprocal optical isolator based on a quarter wave plate placed behind a linear polarizer, with the important difference that both the incident on and transmitted through the ChW electromagnetic waves have the same polarization. The only practical drawback of a ChW-based isolator is that the most reflecting elements of the integrated optical network would have to be operated with the circularly polarized light.

Propagation of electromagnetic waves in a chiral medium (approximated here by a chiral waveguide) is modeled by the following equation [9-11] describing the coupling between the amplitudes $a_+$ of the RHCP and $a_-$ of the LHCP components of the electric field:

$$\left[\frac{\partial^2}{\partial z^2} + \frac{\omega^2}{c^2}n_+^2(z)\right]a_+ = \frac{\omega^2}{c^2}g e^{2ik_u z}a_- \quad (1)$$

$$\left[\frac{\partial^2}{\partial z^2} + \frac{\omega^2}{c^2}n_-^2(z)\right]a_- = \frac{\omega^2}{c^2}g e^{-2ik_u z}a_+ \quad (2)$$

where $n_\pm(z)$ are the refractive indices and g is the strength of the Inter-Helical Bragg Scattering (IHBS). In the context of wave propagation in the plasma with a helical magnetic field, Equations (1) and (2) accurately describe coupling between RHCP and LHCP.

As a simple example, the $TE_{01}$ and $TE_{10}$ modes of a square ($-D/2 < y < D/2$ and $-D/2 < z < D/2$) metallic waveguide propagating in the x direction. RHCP and LHCP modes constructed by linear superposition have the identical refractive indices $n_\pm^2 = \bar{n}^2(\omega) \equiv 1 - \omega_c^2/\omega^2$, where $\omega_c = c\pi/D$. Additionally, the two propagation constants will be modulated with the period $\lambda_u$ due to the realistic (quasi-helical) perturbation, as will be addressed below by the first-principles electromagnetic simulations using FEMLAB [12]. Note that IHBS is a second-order effect: RHCP wave with m=+1 helicity interacts with the helical perturbation and excites the idler (e.g., $TM_{11}$ with m=0) mode. The idler mode, in turn, interacts with the helical perturbation and excites the LHCP mode with m=−1 helicity. Note that the identification of RHCP with m=+1 mode holds only for the waves propagating in the +x direction. For waves propagating in the −x direction, the m=+1 mode corresponds to the LHCP wave.

Assume that $n_\pm^2 = \bar{n}^2(\omega)$ does not depend on z, i.e. that the perturbation is purely helical. Assuming that $a_+ \propto \exp i(k+k_u)z$ and $a_- \propto \exp i(k-k_u)z$, a simple dispersion relation can be derived: $n^2 = n_u^2 + \bar{n}^2 \pm \sqrt{4\bar{n}^2 n_u^2 + g^2}$ where $n = ck/\omega$ and $n_u = ck_u/\omega$. Depending on $\omega$, this equation can have zero, two, or four real roots. It can be analytically shown that, regardless of the chiral medium parameters $\omega_c$, $k_u$, and g, only two propagating solutions exist for $\omega_1 < \omega < \omega_2$, where $\omega_{1,2}^2 = (\omega_c^2 + c^2 k_u^2)/(1 \pm g)$ are the cutoff frequencies. The frequency interval $\omega_1 < \omega < \omega_2$ is sometimes referred to in the chiral media literature as the de Vries band gap [9, 10] for one of the circular polarizations. This remarkable property of the chiral band gap enables a polarizer/one-way waveguide based on the chiral material which transmits one light polarization (e.g., LHCP for the right-handed structure). The approach described here is to create a reasonable approximation to a chiral medium by employing a waveguide with the sidewalls perturbed in a single-helix-like fashion.

Referring now to FIG. 1A, a schematic of a rectangular chiral waveguide 100 with slanted rectangular grooves in all four walls in accordance with one embodiment of the present invention is shown. The grooves can also be channels, cuts, incisions, indentations or other similar structural features. The waveguide 100 has a height (H), a width (W), length of at least a period ($\lambda_u$) and a wave propagation direction (x). A first wall 102 of the waveguide 100 has a first slanted groove 104. A second wall 106 opposite the first wall 102 of the waveguide 100 has a second slanted groove 108. A third wall 110 adjacent to the first wall 102 and second wall 106 has a third slanted groove 112. A fourth wall 114 opposite the third wall 110 has a fourth slanted groove 116. The first, second, third and fourth grooves 104, 108, 112 and 116 are rotated clockwise around the wave propagation direction (x) to approximate the helical groove. The several shaded planes show the density of the Poynting flux for the injected RHCP wave to illustrate the preservation of the circular polarization for the wave with the same sense of rotation as the helical grooves.

The waveguide 100 has four quarter-wavelength sections with rectangular grooves along the waveguide walls. Each of the sections is obtained from the preceding one by translation through the distance $\Delta x = \lambda_u/4$ and rotation by the angle $\phi = \pi/2$ around the propagation direction x. The wall structure of the waveguide 100 thus approximates a helical groove while remaining simple and amenable to standard fabrication techniques (e.g., CMOS-compatible): the waveguide 100 itself and the cuts are rectangular. For computational simplicity, perfect electric conductor (PEC) boundary conditions at the metal wall are assumed. The results are not fundamentally different from those for a high-contrast silicon-based waveguide. Metal walls eliminate the possibility of sideways scattering. Because of the PEC boundary conditions, the scale length L (approximately equal to a quarter of the vacuum wavelength) is arbitrary. In this example, the waveguide's width and height (its y and z dimensions, respectively) are W=H=2L, and the period or pitch of the helix along the wave propagation direction x is $\lambda_u$=10L. The width and height of the cuts are w=h=0.3L.

Maxwells's equations have been solved with periodic boundary conditions at x=0 and x=$\lambda_u$ boundaries, and with PEC boundary conditions at y=±W/2 and z=±H/2 boundaries. The waveguide sections −$\lambda_u$/4<x<0 and $\lambda_u$<x<5$\lambda_u$/4 shown in FIG. 1A were not employed in this source-free (eigenvalue) simulation. The following characteristic frequencies have been found: $\omega_1 L/c$=1.64 (lower edge of the chiral bandgap), and $\omega_2 L/c$=1.70 (upper edge of the chiral bandgap). Strong asymmetry between different propagating mode polarizations is expected inside or near the chiral band gap. This property of the chiral waveguide was verified by launching RHCP and LHCP waves through the waveguide structure depicted in FIG. 1A. The forward RHCP and LHCP waves with the frequencies $\omega = \omega_2$ were launched at the x=−$\lambda_u$/4. The ratio of the transmission coefficients (measure of circular dichroism) of the two polarizations is $T_R/T_L \approx 0.13$. The structure has been numerically verified by launching the two circular polarizations in the −x direction as well, and obtaining the same transmission ratio as for the forward waves. Thus, even a single period of a chiral waveguide acts as a strong polarizer and, for the LHCP light, a polarization-preserving isolator.

As simple as the helically cut rectangular waveguide shown in FIG. 1A is, it may still be challenging to fabricate from an SOI substrate. Specifically, it may be difficult to create rectangular cuts on all four sidewalls of the waveguide. Therefore, the waveguide structure is simplified even further by making slanted cuts on only two opposite walls of the waveguide.

Figure 1B:
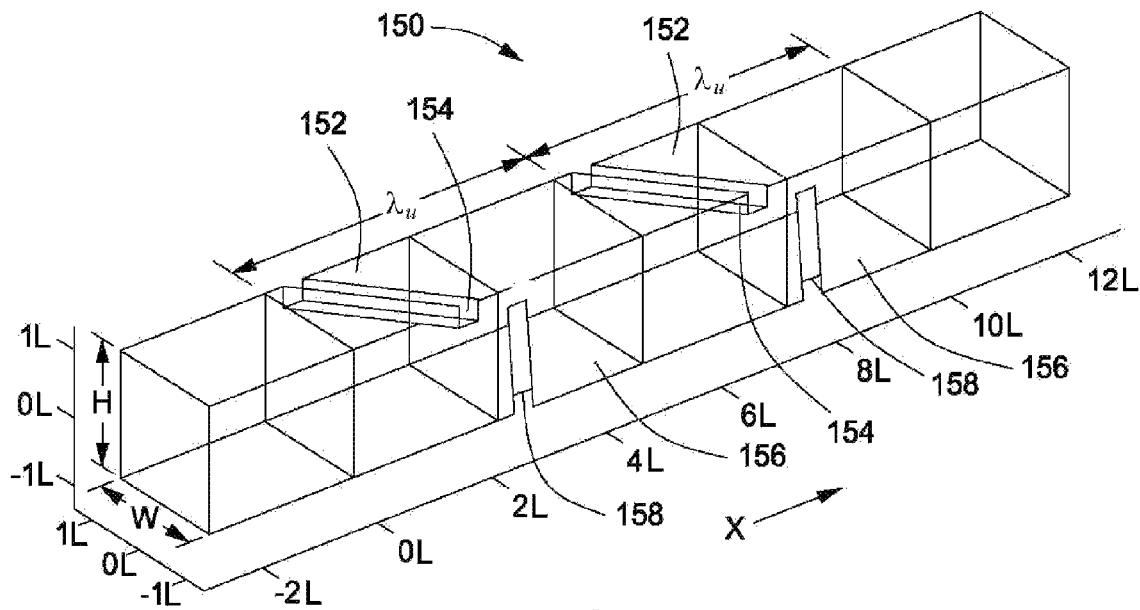
FIG. 1B is a schematic of a rectangular chiral waveguide with slanted wall grooves in the top and bottom walls in accordance with another embodiment of the present invention.

Now referring to FIG. 1B, a schematic of a rectangular chiral waveguide 150 with slanted wall grooves in the top and bottom walls in accordance with another embodiment of the present invention is shown. The grooves can also be channels, cuts, incisions, indentations or other similar structural features. The waveguide 150 has a height (H), a width (W), length of at least a period ($\lambda_u$) and a wave propagation direction (x). A first wall 152 of the waveguide 150 has a first slanted groove 154. A second wall 156 opposite the first wall 152 of the waveguide 150 has a second slanted groove 158. The first and second grooves 154, 158 are rotated clockwise around the wave propagation direction (x) to approximate a helical groove. Two periods ($\lambda_u$) of the structure are shown where the cuts are made on top and bottom walls.

Figure 2:
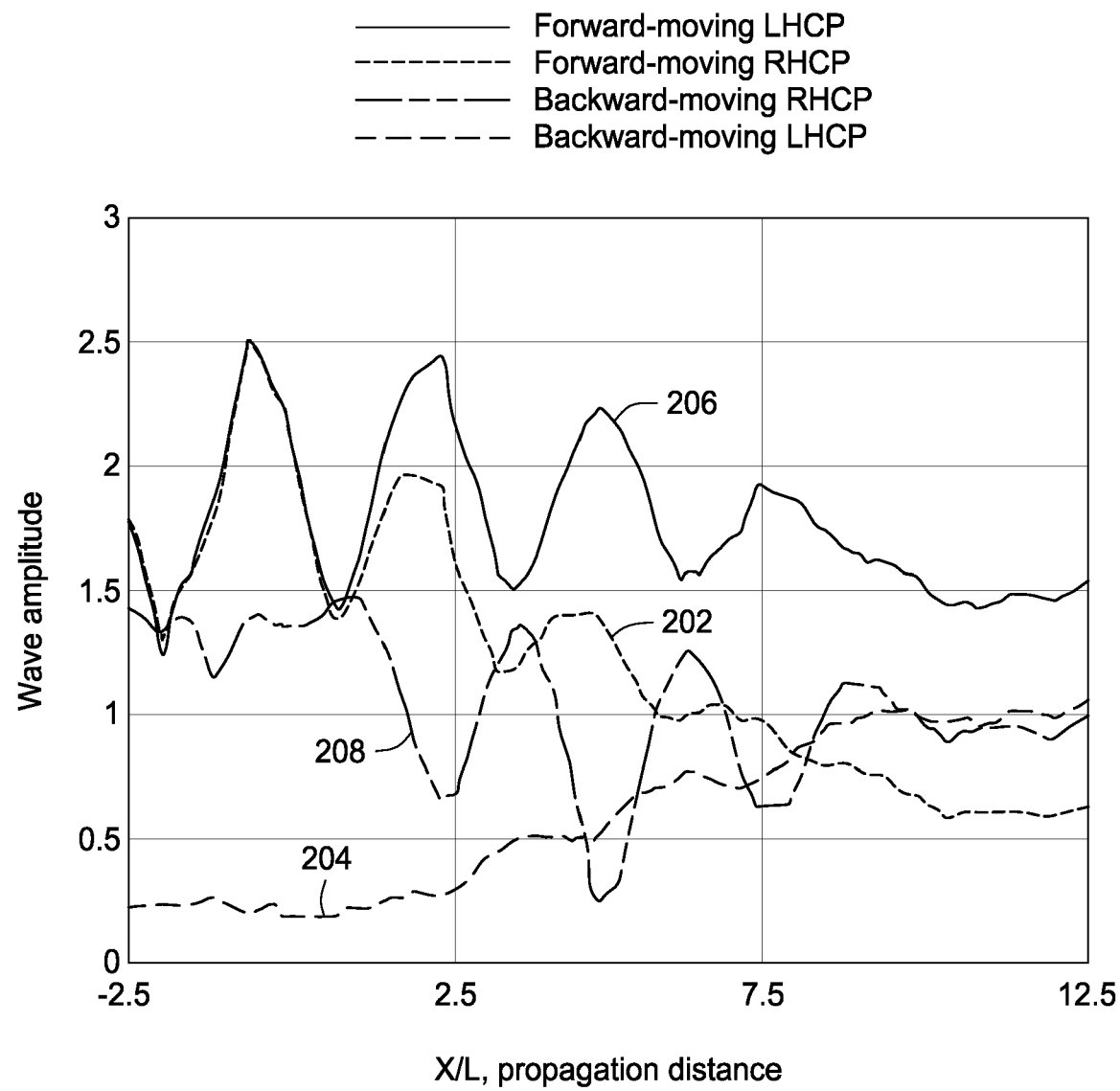
FIG. 2 is a graph of the amplitudes of the RHCP (solid lines) and LHCP (dashed lines) modes along a waveguide in accordance with the present invention.

In this example, it can be shown that this waveguide 150 has a well-defined helicity with a pitch or period $\lambda_u$=5L. However, it is very crude compared with the idealized helical waveguides previously considered in the literature [6, 7, 8], and even with the waveguide shown in FIG. 1A. Nevertheless, the transmission ratio for the two polarizations at $\omega$=1.95 c/L for the same polarizations traveling in opposite directions is $T_R/T_L \approx 0.4$. This constitutes a very strong circular dichroism given that the structure consists of only two periods. To understand why the transmission of LHCP is so small, FIG. 2 plots the on-axis values of the m=+1 (corresponding to forward-moving RHCP 202 and backward-moving LHCP 204) and m=−1 (corresponding to forward-moving LHCP 206 and backward-moving RHCP 208) components (dashed and solid lines, respectively) for the incident RHCP First, consider the incident RHCP wave. The amplitude of the m=+1 component (202) at the waveguide's exit (X=5$\lambda_u$/2=12.5L) is almost three times smaller than at the entrance (X=−$\lambda_u$/2=−2.5L). The total waveguide length in this example is an integer multiple of L (2.5L+12.5L=15L). This is because a significant portion of the forward traveling RHCP component (m=+1) is reflected back into the m=−1 component (208) through the IHBS mechanism. Therefore, the amplitude of the backward traveling RHCP component at the waveguide entrance (X=−$\lambda_u$/2=−2.5L) is almost equal to that of the incident RHCP wave. There is also significant conversion into the forward propagating LHCP that is not described by Equation (1) with $n_+(z) = n_-(z) \equiv \bar{n}(\omega)$. This conversion occurs due to the regular Bragg backscattering of the forward RHCP into the backward LHCP, and the consequent IHBS into the forward LHCP. The end result is that a strong coupling between the forward and backward traveling RHCPs results in the low transmission of the RHCP wave.

Second, consider the incident LHCP wave which has the same sense of rotation as the chiral groove. The amplitude of its m=−1 component (206) at the waveguide's exit is only 25% smaller than its incident amplitude. This reduction is due to the usual (nonchiral) Bragg scattering of the forward moving LHCP wave into a backward moving RHCP. The amplitude of the backward moving LHCP wave is very small at the waveguide's entrance, implying that there is very little IHBS between the forward and backward LHCP waves. The above discussion illustrates that there is a significant asymmetry in IHBS for the LHCP and RHCP waves: chiral scattering is strong for RHCP and weak for LHCP. It appears that the resulting circular dichrosim can be further enhanced by controlling the usual (nonchiral) Bragg scattering. This can be done by introducing additional nonchiral grooves and by gradual tapering of the groove parameters (e.g., width) in a multiperiod ChW.

It has also been verified that the chiral nature of the grooves is necessary for creating circular dichroism of the waveguide. Specifically, the waveguide cuts have been arranged in a nonchiral way by modifying the chiral waveguide shown in FIG. 1B: in the new (nonchiral) waveguide the grooves are slanted in the same directions on the top and bottom walls of the waveguide. Transmission coefficients of the RHCP and LHCP through the nonchiral waveguide are identical (to the accuracy of our simulation, which is better than 1%), independent of the propagation direction. Therefore, only a chiral waveguide can serve as a circular polarizer or a one-way optical element.

The present invention demonstrates that a crude approximation of a chiral medium based on a rectangular waveguide perturbed by slanted incisions can act as a circular polarizer which could also be the basis for an optical isolator. Numerical results are interpreted on the basis of model of an ideal chiral medium. The chiral waveguide shown in FIG. 1B is an extremely crude approximation of the chiral medium for the following reasons: (a) it has different cutoff frequencies for the z and y polarizations; (b) coupling is not only between counter-propagating waves of the same circular polarization, but also between those with opposite polarizations; and (c) the chiral perturbation of the waveguide is a very crude approximation of a helical grove. The fact that even two periods of such a crudely designed chiral waveguide possess a high degree of circular dichroism suggests that a robust design of a polarization-preserving optical isolator/circular polarizer based on chirality is possible.

REFERENCES

[1] M. J. Kobrinsky et al., Intel Technol. J. 8, 129 (2004).
[2] Y. A. Vlasov, M. O'Boyle, H. F. Hamann, and S. J. McNab, Nature 438, 65 (2005).
[3] Y. A. Vlasov and S. J. McNab, Opt. Exp. 12, 1622 (2004).
[4] T. Izuhara, M. Levy, and R. M. O. Jr., Appl. Phys. Lett. 76, 1261 (2000).
[5] J. J. Wang, F. Liu, Z. Deng, X. Liu, L. Chen, P. Sciortino, and R. Varghese, J. Vac. Sci. Technol. B 23, 3164 (2005).
[6] V. I. Kopp, V. M. Churikov, J. Singer, N. Chao, D. Neugroschl, and A. Z. Genack, Science 305, 74 (2004).
[7] G. G. Denisov, V. L. Bratman, A. D. Phelps, and S. V. Samsonov, IEEE Trans. Plasma Science 26, 508 (1998).
[8] V. I. Kopp and A. Z. Genack, Opt. Lett. 28, 1876 (2003).
[9] H. de Vries, Acta Crystallogr 4, 219 (1951).
[10] P. A. Bermel and M. Warner, Phys. Rev. E 65, 010702 (2001).
[11] G. Shvets, M. Tushentsov, M. D. Tokman, and A. Kryachko, Phys. Plasmas 12, 056701 (2005).
[12] FEMLAB Reference Manual, Comsol AB, Stockholm, Sweden, version 2.3 ed. (2001).

Although preferred embodiments of the present invention have been described in detail, it will be understood by those skilled in the art that various modifications can be made therein without departing from the spirit and scope of the invention as set forth in the appended claims.

What is claimed is:

1. An apparatus comprising:
   a waveguide having a height (H), a width (W), a length of at least a period ($\lambda_u$) and a wave propagation direction (x);
   a first slanted groove in a first wall of the waveguide;
   a second slanted groove in a second wall opposite the first wall; and
   wherein the slanted grooves are rotated clockwise around the wave propagation direction (x) to approximate a helical groove.

2. The apparatus as recited in claim 1, wherein the wave guide is substantially rectangular.

3. The apparatus as recited in claim 1, wherein W=H=2L and L is approximately equal to a quarter of the vacuum wavelength.

4. The apparatus as recited in claim 3, wherein the period ($\lambda_u$) comprises an integer multiple of L.

5. The apparatus as recited in claim 1, wherein each slanted groove comprises a channel, a cut, an incision or an indentation that is substantially rectangular having a width (w) and a height (h).

6. The apparatus as recited in claim 5, wherein w=h or w≠h.

7. The apparatus as recited in claim 1, wherein the first and second slanted grooves introduce chirality which transmits one circular polarization of light and reflects the other circular polarization of light.

8. The apparatus as recited in claim 1, wherein the first and second slanted grooves produce a chiral bandgap having a lower edge ($\omega_1$) and an upper edge ($\omega_2$).

9. The apparatus as recited in claim 1, further comprising a metal coating on each wall.

10. The apparatus as recited in claim 1, wherein the waveguide comprises a silicon-based waveguide.

11. The apparatus as recited in claim 1, further comprising:
    a third slanted groove in a third wall adjacent to the first wall and second wall;
    a fourth slanted groove in a fourth wall opposite the third wall; and
    wherein the first, second, third and fourth grooves are rotated clockwise around the wave propagation direction (x) to approximate a helical groove and introduce chirality which transmits one circular polarization of light and reflects the other circular polarization of light.

12. An apparatus comprising:
    a waveguide having a height (H), a width (W), a length of at least a period ($\lambda_u$) and a wave propagation direction (x), and wherein W=H=2L, the period ($\lambda_u$) comprises an integer multiple of L, and L is approximately equal to a quarter of the vacuum wavelength;
    a first slanted groove in a first wall of the waveguide;
    a second slanted groove in a second wall opposite the first wall; and
    each slanted groove comprises a channel, a cut, an incision or an indentation that is substantially rectangular having a width (w) and a height (h), and wherein the first and second grooves are rotated clockwise around the wave propagation direction (x) to approximate a helical groove.

13. The apparatus as recited in claim 12, further comprising:
   a third slanted groove in a third wall adjacent to the first wall and second wall;
   a fourth slanted groove in a fourth wall opposite the third wall; and
   wherein the first, second, third and fourth grooves are rotated clockwise around the wave propagation direction (x) to approximate a helical groove and introduce chirality which transmits one circular polarization of light and reflects the other circular polarization of light.

14. The apparatus as recited in claim 12, further comprising a metal coating on each wall.

15. The apparatus as recited in claim 12, wherein the waveguide comprises a silicon-based waveguide.

16. A method for producing a one-way waveguide and/or a circular polarizer comprising the steps of:
   providing a waveguide having a height (H), a width (W), a length of at least a period ($\lambda_u$) and a wave propagation direction (x); and
   creating a first slanted groove in a first wall of the waveguide and a second slanted groove in a second wall opposite the first wall such that the first and second grooves are rotated clockwise around the wave propagation direction (x) to approximate a helical groove.

17. The method as recited in claim 16, wherein:
   W=H=2L;
   the period ($\lambda_u$) comprises an integer multiple of L;
   L is approximately equal to a quarter of the vacuum wavelength; and
   each slanted groove has a width (w), a height (h), and w=h or w≠h.

18. The method as recited in claim 16, further comprising the step of coating each wall with a metal.

19. The method as recited in claim 16, wherein the waveguide comprises a silicon-based waveguide.

20. The method as recited in claim 16, further comprising the step of creating a third slanted groove in a third wall adjacent to the first wall and second wall and a fourth slanted groove in a fourth wall opposite the third wall such that the first, second, third and fourth grooves are rotated clockwise around the wave propagation direction (x) to approximate the helical groove.

21. The method as recited in claim 16, wherein each slanted groove comprises a channel, a cut, an incision or an indentation that is substantially rectangular having a width (w) and a height (h).

\* \* \* \* \*